Feb. 11, 1969   F. KINAIT   3,426,561

HUB CAP DEVICE

Filed Oct. 22, 1965

INVENTOR:
FRED KINAIT

United States Patent Office 3,426,561
Patented Feb. 11, 1969

3,426,561
HUB CAP DEVICE
Fred Kinait, 225 E. 95th St.,
New York, N.Y. 10028
Continuation-in-part of application Ser. No. 432,529,
Feb. 15, 1965. This application Oct. 22, 1965, Ser.
No. 500,833
U.S. Cl. 70—259
Int. Cl. E05b 65/12
3 Claims

ABSTRACT OF THE DISCLOSURE

An adjustable universal type automotive vehicle wheel hub cap locking device, intended to secure hub caps to wheels and to protect the wheels against theft.

---

This application is a continuation-in-part of my co-pending patent application Ser. No. 432,529 filed Feb. 15, 1965, and now abandoned.

This invention relates in general to automotive vehicles and, more particularly, to an accessory, therefor.

A main object of this invention is to provide a hub cap lock device which can be readily installed on the wheel of an automobile to enable the hub cap to be locked thereon with a key to prevent unauthorized removal and theft.

Another object of the present invention is to provide a hub cap lock assembly which can readily be installed on a vehicle wheel while not interfering with the mounting and dismounting of the vehicle wheel.

A further object of this invention is to provide a hub cap lock assembly which greatly improves the appearance of a hub cap.

Still another object of this invention is to provide a hub cap lock which is easily manufactured at a low cost to fit a wide variety of wheels and hub caps.

An additional object of this invention is to provide a hub cap lock having a mounting post which extends through an aperture at the center of the hub cap, the mounting post having fixed thereon beyond the hub cap a decorative lock member having a body at least one inch in diameter.

Many other objects, advantages and features of invention reside in the particular construction, combination, and arrangement of parts involved in the preferred embodiment of the invention and its practice as will be understood from the following description and accompanying drawing wherein.

Figure 2:
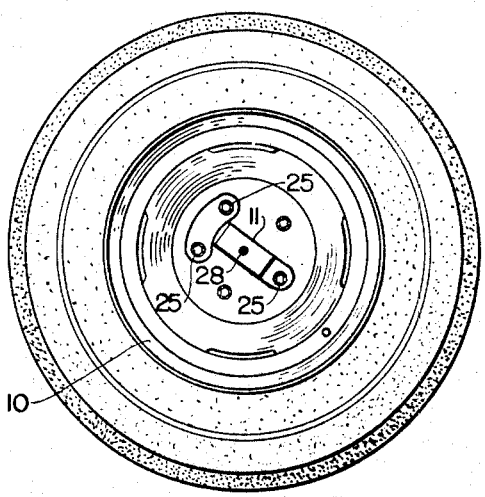
FIGURE 2 is a view similar to FIGURE 1 with the hub cap and the decorative locking member removed.
Figure 3:
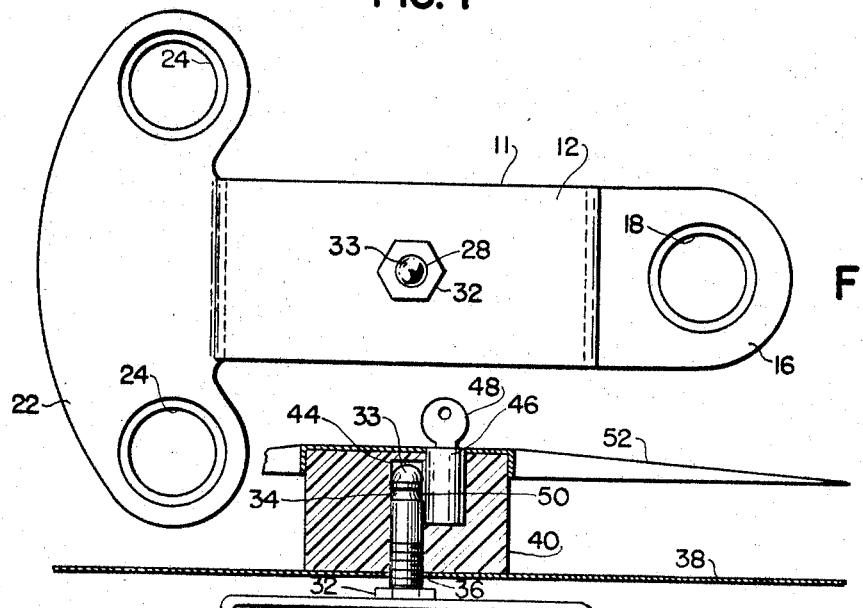
FIGURE 3 is a top plan view of a bracket forming a part of this invention.

Referring to the drawing in detail, the hub cap lock of this invention has a mounting bracket 11 with a central web portion 12. One end of web 12 has a depending leg 14 terminating in a perpendicularly and outwardly extending flange 16 containing a central opening 18 to receive a lug bolt of a wheel therethrough. The opposite end of the web 12 has a second depending leg 20 terminating in an arcuate terminal flange 22 lying in the same plane as flange 16. Flange 22 contains two spaced apart apertures 24 for receiving two lug bolts of a wheel therethrough. As shown in FIGURE 2, mounting bracket 11 is fixed to a vehicle wheel 10 by means of the conventional lug nuts and bolts 25.

The central web 12 of bracket 11 has a mounting post 28 extending through it and fixed by the lock nuts 32 which are screwed about the lower threaded portion 30 to engage opposite sides of web 12. The lock nuts 32 allow the mounting post 28 to be axially longitudinally positioned in relation to bracket 11. The upper end of mounting post 28 terminates in a rounded end 33 and a latch groove 34. Mounting post 28 should be less than one half inch in diameter.

Figure 1:
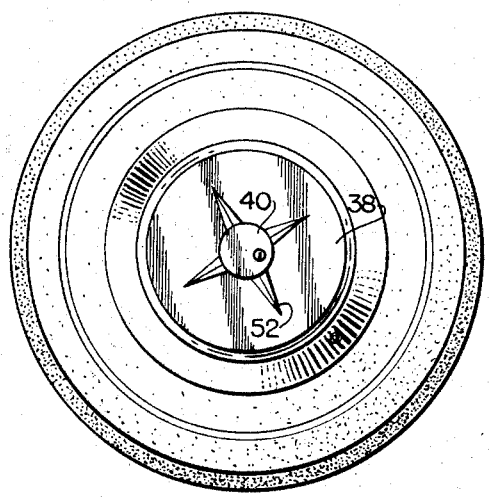
FIGURE 1 is a side elevational view of an automotive vehicle wheel having a hub cap and a hub cap lock installed thereon.
Figure 4:
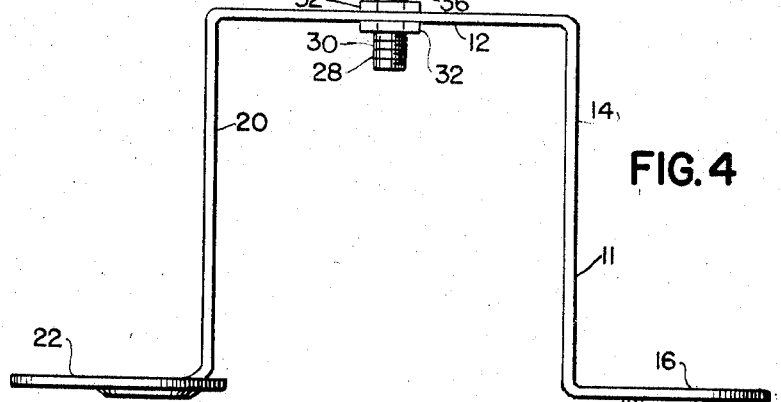
FIGURE 4 is a side elevational view of the bracket of FIGURE 3 with a fragment of a hub cap shown locked thereon by a locking member, the locking member and the hub cap being broken away in section.

Bracket 11 is installed on a vehicle wheel 10 when the wheel 10 is mounted on the wheel drum by means of lug bolts or nuts 25. As shown in FIGURES 1 and 4, the hub cap 38 has an aperture 36 drilled or punched in it to receive the mounting post 28. A lock member 40 is forced over post 28 against hub cap 38 to prevent its unauthorized removal.

Lock member 40 consists of a central body 42 which may be made of a tough plastic such as nylon or from a block of metal such as brass. A central aperture 44 receives post 28. Adjacent to aperture 44 there is seated the tumbler lock 46 operated by key 48. Latch 50 extends from tumbler lock 46 to enter the latch groove 34 and secure lock member 40 in place. A pressed and plated metal molded plastic decorative element 52 is fixed over the central body 42 so that the hub cap lock of this invention greatly enhances the appearance of a wheel.

Since hub caps 38 are usually formed from relatively light gauge pressed steel, lock member 40 should have a central body at least one inch in diameter to prevent hub caps 38 being forced past locks 40 to be removed. Decorative element 52 also helps prevent the removal of a hub cap. Naturally, if a hub cap cannot be removed from a wheel, the wheel and tire cannot be removed and stolen as access to the lug nuts or bolts 25 is prevented.

While this invention has been described in the best form known to me, it will nevertheless be understood that this is purely exemplary and that modifications may be made without departing from the spirit and scope of the invention.

I claim:
1. For use with an automotive vehicle having an axle, a wheel, lug bolts or nuts securing the wheel upon the axle, and a hub cap containing a central aperture detachably mounted upon the wheel, a device for releasably locking said hub cap upon said wheel comprising, in combination, a mounting bracket fixed to said wheel by said lug nuts or bolts, said mounting bracket having a central web spaced outward from said wheel behind said hub cap, a mounting post having a threaded end extending through said central web and an outer end containing a latch groove, lock nuts screwed about the threaded end of said mounting post on each side of said web longitudinally positioning and mounting said post on said web, said mounting post extending through the central aperture in a mounted hub cap, and a lock member having a central body with inner and outer sides, the inner side of said central body containing an aperture to receive the outer end of said mounting post, a tumbler lock set in said central body from the outer side adjacent to the aperture in said central body, a latch projecting from said tumbler lock engaging the latch groove in said mounting post, and a decorative element fixed over said central body extending beyond said central body.

2. The combination according to claim 1 wherein said central body is at least one inch in diameter.

3. The combination according to claim 1 in which said decorative element is made from plastic.

References Cited

UNITED STATES PATENTS

| | | | |
|---|---|---|---|
| 2,107,015 | 2/1938 | Short | 70—259 |
| 2,328,301 | 8/1943 | Shaw | 301—37 |
| 2,372,049 | 3/1945 | Bailey | 301—38 |
| 2,493,366 | 1/1950 | Simcich | 301—37 |
| 2,722,822 | 11/1955 | Thomas | 70—371 X |
| 2,727,990 | 1/1955 | Gaylord | 301—37 |

FOREIGN PATENTS 940,176   3/1948   France.

MARVIN A. CHAMPION, *Primary Examiner.*

R. L. WOLFE, *Assistant Examiner.*